US011636230B2

(12) United States Patent
Haustein et al.

(10) Patent No.: US 11,636,230 B2
(45) Date of Patent: Apr. 25, 2023

(54) SECURING DEALLOCATED BLOCKS IN A FILE SYSTEM (71) Applicant: International Business Machines Corporation, Armonk, NY (US)

(72) Inventors: Nils Haustein, Soergenloch (DE); Sandeep Ramesh Patil, Pune (IN); Sasikanth Eda, Vijayawada (IN); Dominic Mueller-Wicke, Weilburg (DE)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 16/790,798

(22) Filed: Feb. 14, 2020

(65) Prior Publication Data
US 2021/0256167 A1 Aug. 19, 2021

(51) Int. Cl.
G06F 16/00 (2019.01)
G06F 21/79 (2013.01)
G06F 16/17 (2019.01)
G06F 16/11 (2019.01)

(52) U.S. Cl.
CPC .............. G06F 21/79 (2013.01); G06F 16/11 (2019.01); G06F 16/1727 (2019.01)

(58) Field of Classification Search
CPC ....... G06F 21/79; G06F 16/1727; G06F 16/11
USPC .......................................................... 713/193
See application file for complete search history.

(56) References Cited

U.S. PATENT DOCUMENTS

| 7,581,118 | B2 | | 8/2009 | McGovern | |
|---|---|---|---|---|---|
| 9,251,050 | B2 | * | 2/2016 | Baldwin | G06F 9/50 |
| 9,311,501 | B2 | * | 4/2016 | Islam | G06F 21/6218 |
| 9,671,977 | B2 | * | 6/2017 | Olson | G06F 3/0611 |
| 9,910,742 | B1 | * | 3/2018 | Faibish | G06F 3/0605 |
| 2002/0124052 | A1 | * | 9/2002 | Brown | G06F 21/51 |
| | | | | | 709/206 |
| 2007/0006294 | A1 | * | 1/2007 | Hunter | H04L 63/1441 |
| | | | | | 726/1 |
| 2014/0281330 | A1 | * | 9/2014 | Baldwin | G06F 11/3034 |
| | | | | | 711/170 |
| 2018/0285370 | A1 | * | 10/2018 | Bhagwat | G06F 16/122 |
| 2018/0373624 | A1 | * | 12/2018 | Naccache | G06F 12/023 |

FOREIGN PATENT DOCUMENTS

DE 112010004573 T5 * 11/2012 ............. G06F 3/061

OTHER PUBLICATIONS

Wei et al., "Reliably Erasing Data from Flash-Based Solid State Drives", Printed Jan. 24, 2020, 13 pages.
Chow et al., "Shredding Your Garbage: Reducing Data Lifetime Through Secure Deallocation", USENIX Association, 14th USENIX Security Symposium, Printed Jan. 24, 2020. 16 pages.

* cited by examiner

Primary Examiner — Monica M Pyo
(74) Attorney, Agent, or Firm — Gilbert Harmon, Jr.

(57) ABSTRACT

A computer-implemented method for operating a storage system comprising a file system for managing a data object in one or more storage blocks may be provided. The method comprising receiving from a file system manager a message indicating that the data objects is to be encrypted, determining, in response to the received message, a set of unallocated storage blocks that were previously allocated for storing at least a portion of the data object, and rendering content of the unallocated storage blocks of the set unreadable.

18 Claims, 5 Drawing Sheets

| file ID | pool 1 | | pool 2 | | pool n | | backup |
|---|---|---|---|---|---|---|---|
| | alloc | un-alloc | alloc | un-alloc | alloc | un-alloc | |
| ... | ... | ... | ... | ... | ... | | |

| file ID | pool 1 | |
|---|---|---|
| | allocated | unallocated |
| 1 | 1,2,3,4 | |
| 2 | 10,11,34,56 | 6,7,8,9,88,89,90,100,101,203,233,332 |
| 3 | 20,21,22,23 | 66,23,56,68,69 |

| file ID | pool 1 | | pool 2 | | pool n | | backup |
|---|---|---|---|---|---|---|---|
| | alloc | un-alloc | alloc | un-alloc | alloc | un-alloc | |
| 100200300 | 1,2,3,4 | 10,11, 34,56 | ... | | ... | | |

SECURING DEALLOCATED BLOCKS IN A FILE SYSTEM

BACKGROUND

The invention relates generally to a computer-implemented method for operating a storage system, and more specifically, to a computer-implemented method for operating a storage system comprising a file system for managing a data object in one or more storage blocks. The invention relates further to a storage control system for operating a storage system, and a computer program product.

More general, a file within a file system is comprised of data blocks. When the file is first created, its data are stored in data blocks on a storage device. During the life cycle data blocks may be re-allocated and unallocated, leaving original (old, deallocated) data blocks on the storage device and may be moved to other storage devices. Certain file system operations cause data blocks of a file to become deallocated, such as tiering from one storage tier to another, defragmentation that moves data blocks into consecutive entities or the use of certain applications such as text editors.

Defragmentation is used to ensure a fast access to files that have been spread across different blocks in a file system. Defragmentation is a process that reduces the amount of fragmentation by collocating data blocks of files. It does this by physically organizing the contents of the fragments into contiguous regions in an underlying storage device that is used to store files into. This requires copying data blocks of a file to new data blocks that are continuously arranged with other data blocks of the same file. Consequently, the old data blocks of the file are deallocated or unallocated.

SUMMARY

According to one aspect of the present invention, a computer-implemented method for operating a storage system comprising a file system for managing a data object in one or more storage blocks may be provided. The method may comprise receiving from a file system manager a message indicating that the data object is to be encrypted, determining, in response to the received message, a set of unallocated storage blocks that were previously allocated for storing at least a portion of the data object, and rendering content of the unallocated storage blocks of the set unreadable.

According to another aspect of the present invention, a related storage control system for operating a storage system, the storage system comprising a file system for managing a data object in one or more storage blocks of the storage system may be provided. The storage control system may comprise a block tracking module adapted for receiving from a file system manager a message indicating that the data object is to be encrypted, wherein the block tracking module is adapted for determining, in response to the received message, a set of unallocated storage blocks that were previously allocated for storing at least a portion of the data object and rendering content of the unallocated storage blocks of the set unreadable.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Preferred embodiments of the invention will be described, by way of example only, and with reference to the following drawings.

DETAILED DESCRIPTION

In the context of this description, the following conventions, terms and/or expressions may be used:

The term 'storage system' may denote here a set of storage devices with a related storage management module. The storage devices may be implemented as storage drives which may be, e.g., solid state disks (SSD), flash disks, magnetic disk drives, an object storage, optical disks, and magnetic tapes. A drive can also be a volume provided by an intelligent disk system. Such volume may reside on a redundant array of independent disks (RAID).

The term 'file system' may control how data are stored and retrieved on a storage system. Without a file system, information placed in a storage medium would be one large body of data with no way to tell where one piece of information stops and the next begins. By separating the data into pieces (e.g., blocks) and assigning an identifier to each block, the information may easily be isolated and identified.

The term 'data object' may denote any type of file in a file system, but also a logical unit, a logical volume, or a block of data.

The term 'storage block' may denote a predefined number of bits or bytes managed as one unit on a storage device. Each storage block may be identifiable by a unique identifier for storage device.

The term 'file system manager' may denote a unit controlling the functioning of the file system, i.e., keeping track of different blocks in one or more storage system for different files.

The term 'encrypted' may denote that the content file has been made unreadable unless a decryption key is available. Symmetrical (i.e., using the same key for an encryption and decryption) or asymmetrical encryption (i.e., using different but related keys for the encryption and decryption) methods exist.

The term 'unallocated storage block' may denote a block having been part of a stored data object or file and may no longer be a direct and active portion of the file. However, due to a certain operation—in particular, defragmentation, migrating, encrypting, deleting, backing it up, and the like—the related blocks on the file system may only be marked as unused. However, the information may still be available unchanged. Thus, principally it is still readable. It may also be noted that the unallocated storage block may have undergone the process of de-allocation. Hence, such block may also be denoted as deallocated block.

The term 'unreadable' may denote that data—in particular unallocated blocks of a file—cannot be read anymore by the file system. The information is no longer available and access is definitely denied. This may be achieved by encrypting the data in the unallocated blocks, overwriting it, or permanently erasing it.

Protection of intellectual property, data privacy and other vertical market regulations guide enterprise organizations to ensure a proper protection of their data. The method of choice is often encryption. However, during an encryption and decryption process, unencrypted data fragments of the encrypted data may unintentionally continue to be available on a storage system.

More general, a file within a file system is comprised of data blocks. When the file is first created, its data are stored in data blocks on a storage device. During the life cycle data blocks may be re-allocated and unallocated, leaving original (old, deallocated) data blocks on the storage device and may be moved to other storage devices. This may represent a security exposure in case the file is encrypted later on. Because the original (old and unallocated) blocks of a file may not be encrypted and hence can be read by an attacker in clear text form. Certain file system operations cause data blocks of a file to become deallocated, such as tiering from one storage tier to another, defragmentation that moves data blocks into consecutive entities or the use of certain applications such as text editors. The resulting security challenges involved with these operations can be summarized as follows.

Defragmentation is used to ensure a fast access to files that have been spread across different blocks in a file system. Defragmentation is a process that reduces the amount of fragmentation by collocating data blocks of files. It does this by physically organizing the contents of the fragments into contiguous regions in an underlying storage device that is used to store files into. This requires copying data blocks of a file to new data blocks that are continuously arranged with other data blocks of the same file. Consequently, the old data blocks of the file are deallocated or unallocated. Problems occur if later-on the file is encrypted and unencrypted fragments as a result of the defragmentation process are still available and accessible.

Similar problems may occur in tiered file systems and during editing an encrypted file, whereby an unencrypted copy of the file may be created on the storage system. Also different copies of a file on different storage systems may lead to the same problem of leaving unencrypted copies behind after the file has been encrypted. The here proposed method and system address this problem and may ensure safe and secured deallocated blocks.

The proposed computer-implemented method for operating a storage system comprising a file system for managing a data object in one or more storage blocks may offer multiple advantages and technical effects:

Generally, an unallowed access to still unencrypted historic portions or fragments of files which have been encrypted will no longer be possible. The storage blocks of the file which has been encrypted are not only being made inaccessible but the information on these unallocated blocks is rendered unreadable by a permanent erase process and overwriting or an encryption. The encryption may optionally be carried out with the same key with which the target file is encrypted. Alternatively, a unique system encryption key may be used instead. The unique system encryption key may be changed periodically of according to predefined events in a particular manner.

In any case, a complete history of unallocated blocks of files in a tiered file system and also across file systems and/or storage systems may be generated. A new block tracking module managing a block tracking table may be instrumental in achieving this goal. By communicating with the file system manager or by integration into the system manager, a direct synchronization of activities of the file system manager and the block tracking module may be guaranteed.

According to one advantageous embodiment of the method, the storage system may be a tiered storage system comprising at least two storage tiers. Thereby, the determining the set of unallocated storage blocks may comprise identifying storage blocks of one storage tier of the at least two storage tiers previously allocated to the data object and migrated (i.e., moved from one storage tier to another) to the other storage tier of the at least two storage tiers currently allocated to the data object. This feature may ensure that the control over the unallocated storage may also work cross-tier in the storage system.

Thereby, the determination of the set of unallocated storage blocks may comprise whether such unallocated storage blocks for the storage object in question can be found in the block tracking table. If that is not the case, most probably, the block may have already been reused for another file. This feature is also valid for a non-tiered storage system, i.e., for a normal single disks drive computer or storage system.

Principally, there may be three different options for determining that an object has unallocated blocks. One would be that the block tracking module requests related information from the file system manager. The file system manager may always have data by default about whether a block is used or unused. Otherwise, it would not be possible to retrieve a file. Thus, no additional tracking would be required and no additional overhead of compared to the normal operation of the file system manager is required. The block tracking module would just request the related information from the file system manager which may respond with a logical "1" ("yes") or "0" ("no"). Such a solution may rely on a fast communication between the block tracking module and the file system manager. However, if the block tracking module is integral part of the file system manager, such communication is not problematic.

Secondly, the block tracking module may be informed event-driven by a message from the file system manager to the block tracking when a previously used block is re-used to store data for a new data object. The block tracking module then removes this block from the block tracking table. Now the block tracking module may set a bit in the block tracking table relating to the block in question and trigger all required actions, i.e., ensuring that the now unallocated block may be rendered unreadable.

As a third option, the block tracking module may generate and store—e.g., in an extended version of the block tracking table—a checksum of the content of the block in question. Later, if there is an unallocated block, the block tracking module may compare the then present checksum with the one stored by the block tracking module. Also this may require an extension of the block tracking table.

According to another advantageous embodiment of the method, the rendering the content of the storage block of the set unreadable may comprise erasing—in particular, erasing it permanently—the content of the storage blocks of the set. In this case, the already available functions of the file system may be used. The erasing may be performed such that the unallocated block may become factually unreadable, e.g., by overwriting it with a random or predefined bit pattern. This goes beyond the usual marks in the block allocation table by the file management system that the relevant block has been deleted. Hence, and according to an alternative embodiment of the method, the rendering the content of the storage block of the set unreadable may comprise overwriting the content of the storage blocks of the set.

According to a possible embodiment of the method, the rendering the content of the storage blocks of the set may comprise encrypting the content of the storage blocks of the set. Thus, also in this case, the content, i.e., the data may become unreadable as long as the encryption key is not available. However, for normal read operations this is not the case; therefore, also in this case, the unallocated blocks cannot be read anymore by an unauthorized access.

According to an additional embodiment of the method, the data object may comprise at least one of a file, a logical unit, a logical volume, or a block of data. With this, all objects storable in a file system may be addressed.

According to an enhanced embodiment of the method, the storage system may be a tiered storage system comprising at least two storage tiers and/or a second storage system. Thereby, the determining the set of unallocated storage blocks may comprise identifying an unencrypted copy of the data object in another storage tier or a second storage system, and generating a message indicative of the unencrypted copy. This message may then be used to render the unallocated storage block belonging to the original storage object to be encrypted unreadable according to the same procedure, as explained above.

According to a further embodiment, the method may further comprise encrypting the unencrypted copy of the data object in another storage tier or another storage system, and rendering blocks in the other storage tier or other storage system relating to content of the unallocated storage blocks previously allocated to the unencrypted copy of the data object unreadable. If the second storage system may be used as a backup system, the proposed concept may also be extended to backup systems.

Also here, the determination whether the previously and potentially unallocated block have been repurposed as storage blocks for other files can be performed by referring to the block tracking table. In case they are re-used, the block tracking module may reset the entries for the unallocated blocks in the block tracking table.

As already discussed above, three options may to determine whether a block is unallocated: (i) the block tracking module requests related information from the file system manager; (ii) the block tracking module may be informed event-driven by a message form the file system manager to the block tracking module that a request for a file comprising the specific block in question; and (iii) the block tracking module may generate and store a checksum of the content of the block in question.

According to another advantageous embodiment, the method may also comprise operating a block tracking module in communicative contact with the file system manager. The block tracking module may be adapted for keeping track of all allocated blocks and unallocated blocks of all data objects of the storage system enabling a block allocation and block de-allocation—so that the related blocks becomes unallocated—history. This feature may render the here proposed concept also useful for other applications. It may, e.g., allow reconstructing earlier versions of a storage object in an easy way.

According to another further enhanced embodiment of the method, the block tracking module may also be adapted for keeping track of a data object, i.e., the related storage blocks—if the data object has been moved to another storage system. Hence, the history tracking data objects may also be used across storage systems.

In the following, a detailed description of the figures will be given. All instructions in the figures are schematic. Firstly, a block diagram of an embodiment of the inventive computer-implemented method for operating a storage system comprising a file system for managing a data object in one or more storage blocks is given. Afterwards, further embodiments, as well as embodiments of the storage control system for operating a storage system, will be described.

Figure 1:
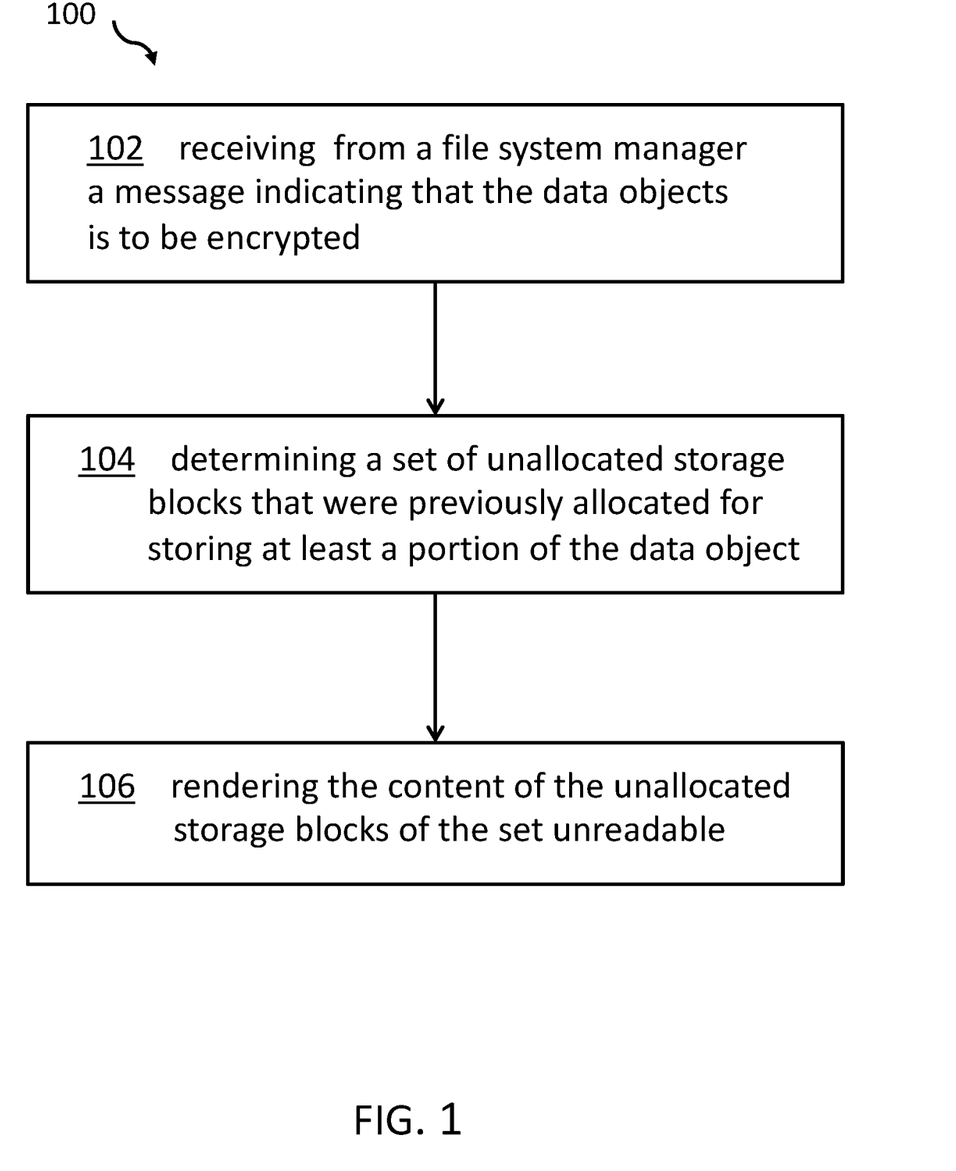
FIG. 1 shows a block diagram of an embodiment of the inventive computer-implemented method for operating a storage system comprising a file system for managing a data object in one or more storage blocks.

FIG. 1 shows a block diagram of a preferred embodiment of the computer-implemented method 100 for operating a storage system. The storage system comprises a file system for managing a data object in one or more storage blocks of the storage system, and the method 100 comprises receiving, 102, from a file system manager a message indicating that the data object is to be encrypted. The message can be transmitted directly between the file system manager and a block tracking module, or indirectly via signal.

The method 100 comprises determining, 104, in response to the received message, a set of unallocated storage blocks that were previously, i.e., before the encryption, allocated for storing at least a portion of the data object, and rendering, 106, the content of the unallocated storage blocks of the set unreadable.

It should also be noted that the unallocated storage block can reside on the same storage tier, the same storage system and/or also on another storage system.

Figure 2:
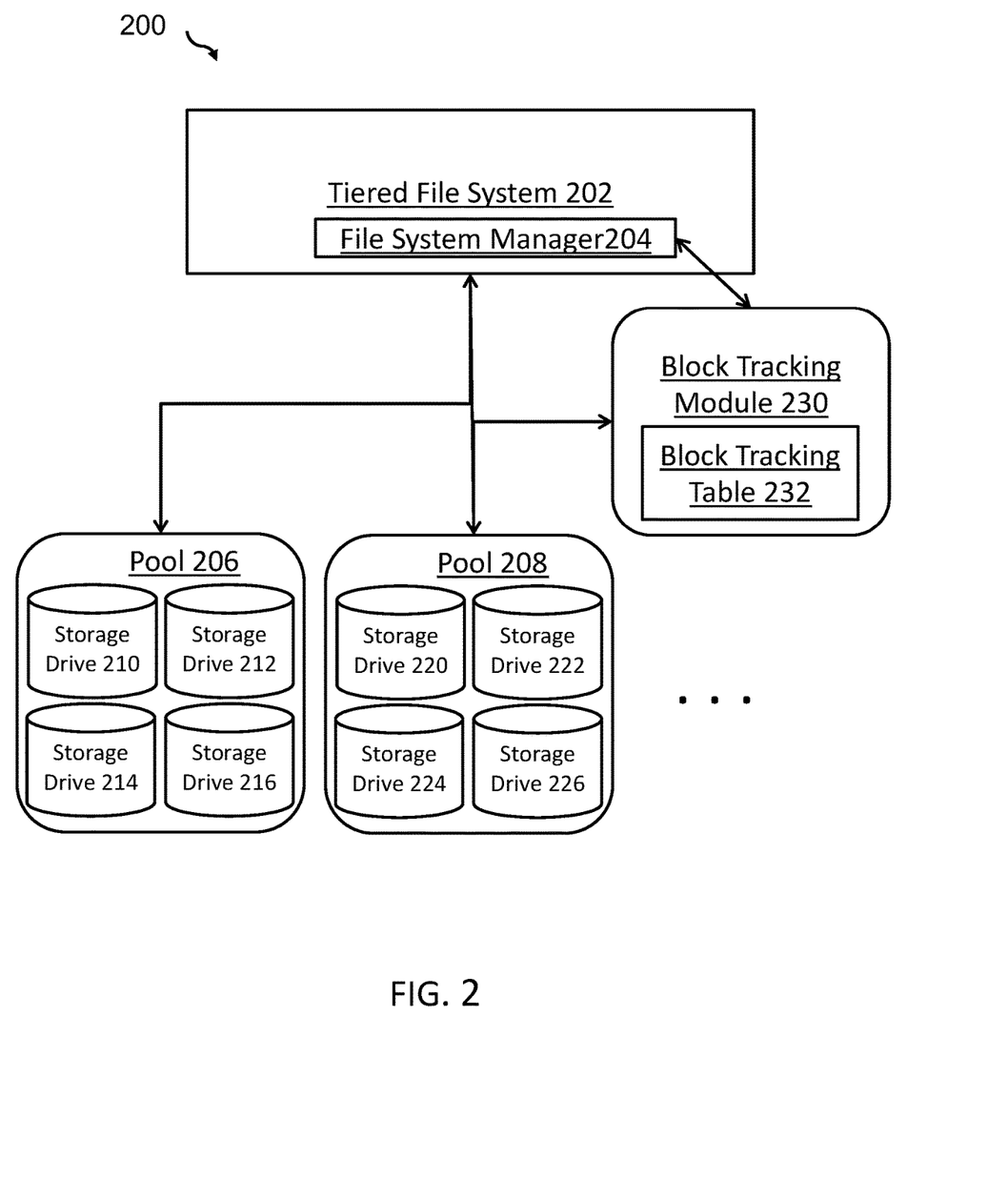
FIG. 2 shows a block diagram of an embodiment of a tiered file system.

FIG. 2 shows a block diagram of an embodiment of a tiered file system 202 that manages a pool of storage drives. Storage drives are storage media, such as but not limited to, solid state disks (SSD), flash disks, magnetic disk drives, objects storage, optical disks as well as magnetic tapes. A drive can also be a volume provided by an intelligent disk system. Such volume may reside on a redundant array of independent disks (RAID). As shown in FIG. 2, the architecture of the tiered file storage 200 includes a tiered file system 202 that is comprised of two storage pools 206 and 208. Exemplary, the storage pool 206 comprises the drives 210 to 216, and the storage pool 208 comprises the storage drives 220 to 226. The number of storage drives per pool as well as the number of pools within the tiered file system is not limited to two storage pools, as shown.

When a file is stored in the tiered file system 202, it is split into blocks that are stored on the storage drives of one of the pools 206, 208. For example, file 1 is stored in pool 206, whereby blocks of the file are stored on the associated drives: a first block is stored on the storage drive 210, a second block is stored on the storage drive 212, a third block is stored on the storage drive 214, a fourth block is stored on the storage drive 216, and so on. The file system manager 204 keeps track which block is stored on which storage drive. This may also enhance the read speed because the blocks may be read at least partially in parallel.

The size of the blocks might be in accordance to the sector size of the storage drives, or it might be in accordance to a virtual volume block size. Virtual volumes are provided by intelligent disk systems that store the blocks on a Redundant Array of Independent Disk (RAID). A block might also be a data and parity block on a RAID.

In order to balance the capacity in the file system pools 206 and 208, files can be migrated from one pool to another. For example: file 1 that was initially stored in pool 206 is migrated to pool 208 and its associated drives. Thereby, all the blocks of file 1 are copied from the storage drives of pool 206 to the storage drives of pool 208. Afterwards, the blocks that where occupied, i.e., allocated, on pool 206 are deallocated or unallocated which means they can be re-used for other files. However, tiered file systems may not re-use unallocated blocks immediately. In fact it can take multiple days, weeks or month before deallocated or unallocated blocks are re-used. In the meantime, the content in the unallocated blocks may still be accessible, although not necessary directly via the file system. However, there remains a risk of unallowed access.

In order to avoid such a situation, the block tracking module 230 is in communicative contact with the file manager 204 to keep track of unallocated blocks which content has been encrypted as a new file. For that purpose, the block tracking module 230 manages a block tracking table 232 in order to keep track of unallocated blocks comprising at least parts of the file to be encrypted across the tiered file system.

The block tracking module 230 can be coupled to the file system manager 204 for the file system 202, e.g., by means of an application programming interface (API). Through this coupling, the block tracking module obtains required information from the file system manager 204, e.g., the blocks of a file stored on any of the pools 206, 208, or others. Furthermore, the file system manager 204 may inform the block tracking module 230 when the file is being migrated, encrypted, replicated, or backed up. The block tracking module 230 "follows" the file using the block tracking table, thereby enabling a complete history of storage locations and related storage blocks of the file.

Figure 3:
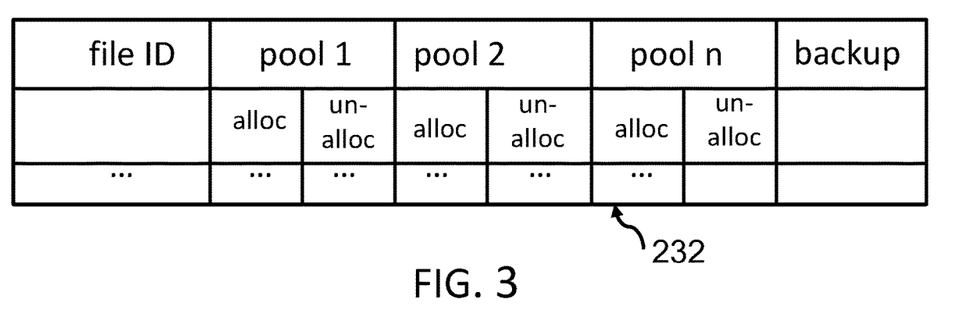
FIG. 3 shows an exemplary structure of a block tracking table.

FIG. 3 shows an exemplary structure of the block tracking table 232. The first column comprises the file identifier; this can be the file name or a unique i-node number. The second column comprises the blocks, the file occupied on pool 1, 206. The third column comprises the blocks of the file occupied on pool 2, 208 after the file has been moved. The fourth column comprises the blocks of the occupied file on pool N. The fifth column comprises the identifier of the file on a potential second storage system or a backup system. Each pool has a column for allocated and unallocated blocks of a file to track the trace of the file.

It may be noted that in case the file is moved to another storage system with another file system, an inter-file-management-system data exchange may be required. It also may require a cross-wise update of the block tracking tables in both file system for the relevant files. However, it cannot be guaranteed that all file systems are equipped with a block tracking module. If a file is moved from one storage system comprising the block tracking module to another with a different file management system and without a block tracking module, the attempt for a cross-synchronization of the block tracking table for the related files is simply not performed. Instead, a warning may be issued but the copy process from one storage system to the other continues without time delay.

Figure 4:
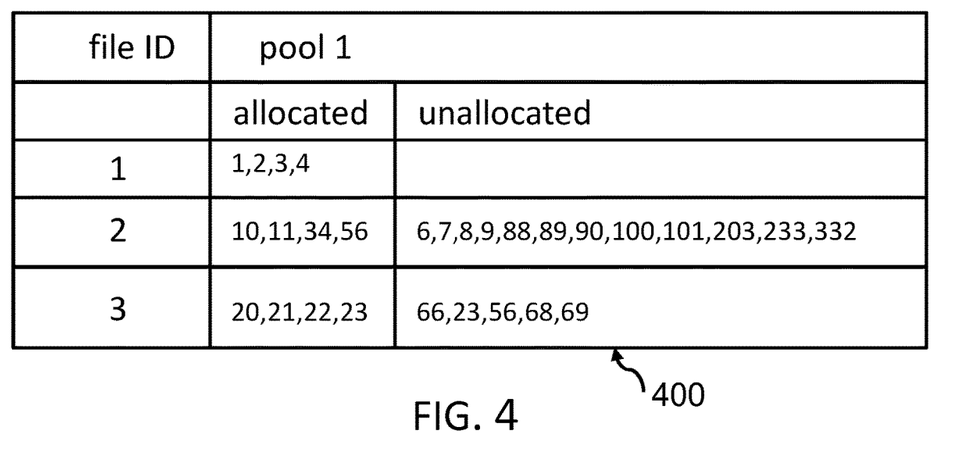
FIG. 4 shows an exemplary structure of the block tracking table for a file creation and a write process.

FIG. 4 shows an exemplary structure 400 of the block tracking table for a file creation and a write process within a file system with one storage pool. It is assumed, that file 1 was newly created and has only the primary used blocks. File 2 was created in the past and has some fragmentation because of several right operations on the file in the path. The file 2 is old and has a longer trace as indicated by the allocated and unallocated blocks in the second and third column. E.g., file 2 is now stored in blocks 10, 11, 34, 56. In the past, portions of the file have also been stored in blocks 6, 7, 8, 9, 88, 89, 90, 100, 101, 203, 233, 332. Additionally, file 3 was recently defragmented and uses sequential blocks 20, 21, 22, 23 now. Also the unallocated blocks of file 3 are shown in the third column.

Figure 5:
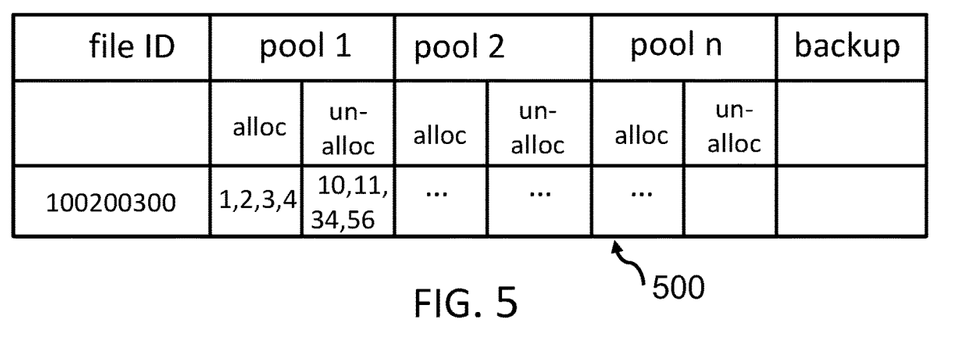
FIG. 5 shows an exemplary structure of the block tracking table in the context of a migration process.

FIG. 5 shows an exemplary structure 500 of the block tracking table in the context of a migration process. When a file is migrated from a source storage pool to a destination storage pool, the block tracking module gets notified by the file system manager. Responsive to this, the block tracking module 230 determines the source storage pool and the destination storage pool for this file migration by communicating with the file system manager.

Furthermore, the block tracking module 230 determines whether the file is already encrypted. If the file is not encrypted, the block tracking module 230 inquires the file system manager to determine the blocks of the file on the source storage pool and updates the block tracking table, as shown in FIG. 5.

E.g., the file with the identifier 100200300 (column 1) was started on blocks 1, 2, 3, 4 in pool 1 (column 2) in a non-encrypted form. Similarly, the file may further be migrated from pool 2 to pool N. In this case, the block tracking module 230 will determine and store the blocks where the file was stored in pool 2 and update the table (column 3).

If the file with the ID 100200300 is being encrypted, the block tracking module 230 gets notified by the file system manager. The file system manager can be extended to provide this functionality to notify the block tracking module 230 about the file encryption process. In response, the block tracking module 230 determines the identifier of the file, the current pool of the file, and the encryption key by communicating with the file system manager.

For example, the file identifier is 100200300, the current pool is pool 2 and the encryption key might be 0102030405060708090A0B0C. The block tracking module 230 now determines if the file has unallocated blocks in other pools by matching the file identifier in the block tracking table (column 1). For example, the file with ID 100200300 (row 2, column 1) has unallocated blocks in pool 1 (row 2, column 2).

If the file has unallocated blocks, then the block tracking module 230 inquires the file system manager which of the deallocated blocks have not been re-used yet. For example, the blocks 1, 2, 3 might not have been re-used on pool 1.

For all blocks that have not been re-used the block tracking module 230 encrypts these blocks with the key received by the file system manager. For example, blocks 1, 2, 3 in pool 1 are encrypted.

Using the block tracking table 232, the block tracking module 230 further determines if the file has a backup identifier by inspecting column 5 (compare FIG. 5). For example, the file with ID 100200300 has a backup identifier 223344 (row 2, column 5). If the file has been a backup ID, then the block tracking module encrypts the file in the backup server, or makes it otherwise unreadable.

Figure 6:
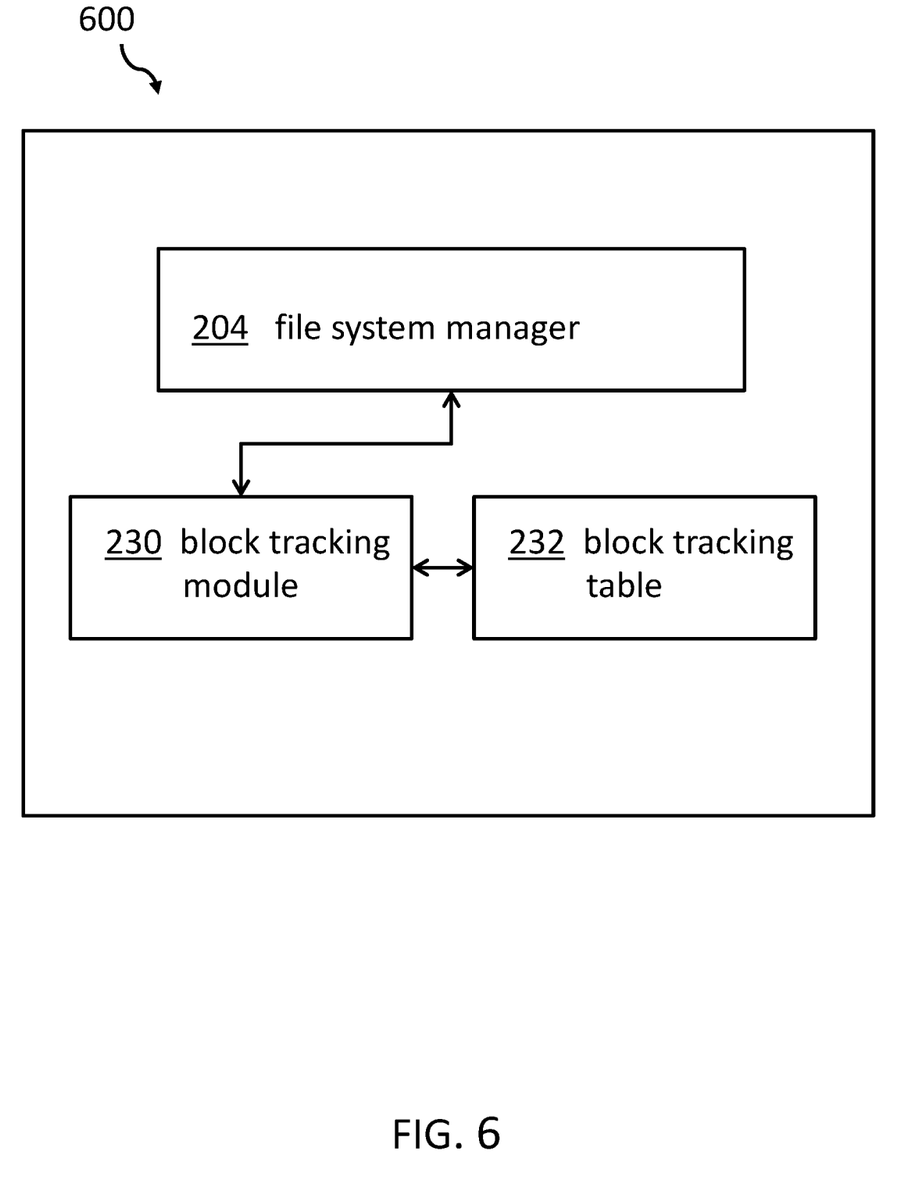
FIG. 6 shows a block diagram of an embodiment of the storage control system for operating a storage system comprising a file system for managing a data object in one or more storage blocks.

FIG. 6 shows a block diagram of an embodiment of the storage control system 600 for operating a storage system comprising a file system for managing a data object in one or more storage blocks. The storage control system 600 comprises a block tracking module 602 adapted for receiving from a file system manager 204 (compare FIG. 2) a message indicating that the data object is to be encrypted. Thereby, the block tracking module 230 (compare FIG. 2) is adapted for determining, in response to the received message, a set of unallocated storage blocks that were previously allocated for storing at least a portion of the data object, and rendering content of the unallocated storage blocks of the set unreadable. It should also be noted that the file system manager, the block tracking module 230 and a storage for tracking table 232 (compare FIG. 2) can be implemented completely and hardware comprising communication channels between them.

It shall also be mentioned that the determination the set of unallocated storage blocks that were previously allocated for storing at least a portion of the data object is supported by the block tracking module by referring to the block tracking table. It may well be possible that the blocks that were previously allocated for storing at least a portion of the data object have been allocated to new files. In that case unallocated blocks relating to the data object may not be found.

Figure 7:
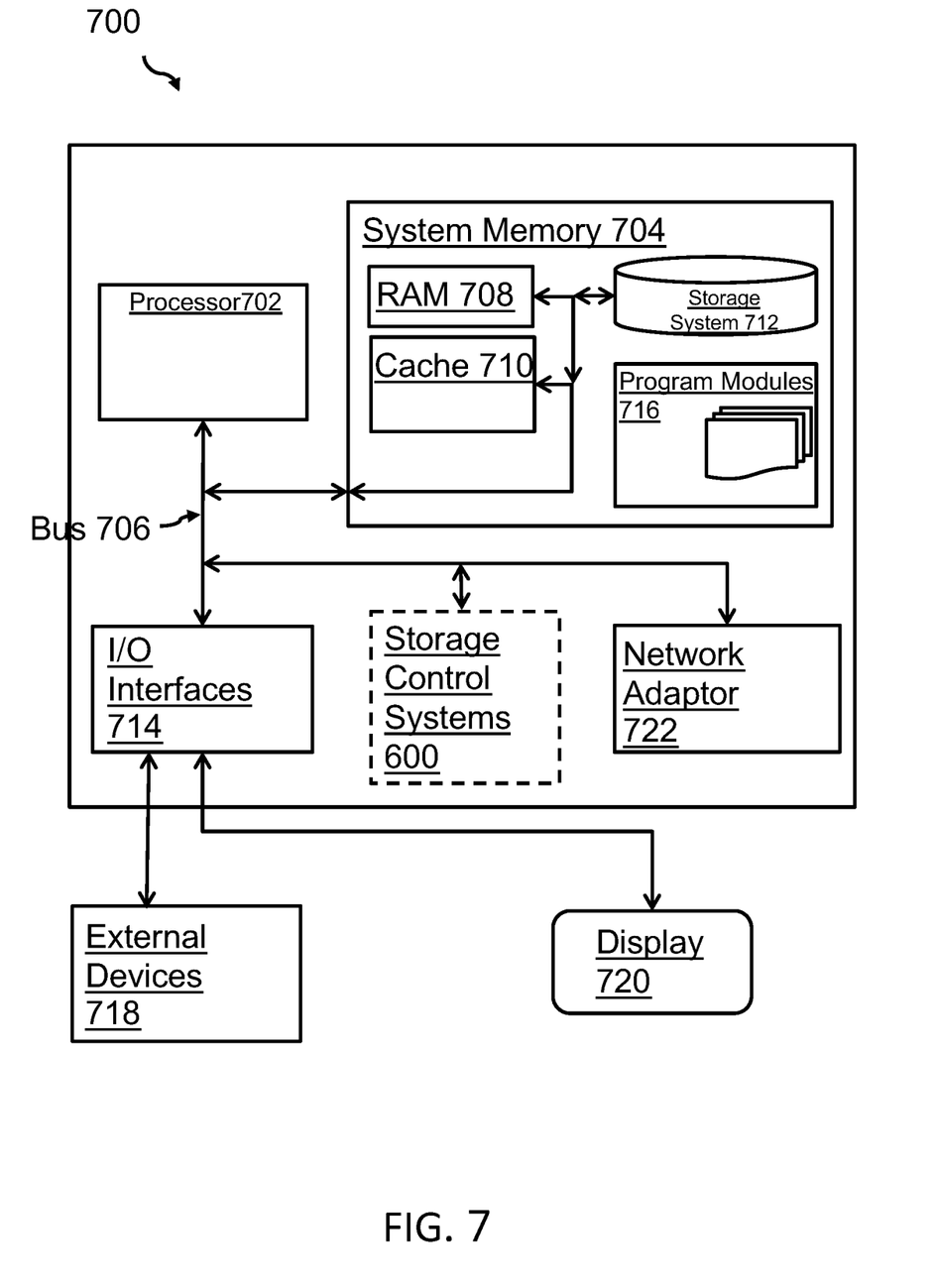
FIG. 7 shows a block diagram of a computing system comprising the storage control system according to FIG. 6.

Embodiments of the invention may be implemented together with virtually any type of computer, regardless of the platform being suitable for storing and/or executing program code. FIG. 7 shows, as an example, a computing system 700 suitable for executing program code related to the proposed method.

The computing system 700 is only one example of a suitable computer system, and is not intended to suggest any limitation as to the scope of use or functionality of embodiments of the invention described herein, regardless, whether the computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both, local and remote computer system storage media, including memory storage devices.

As shown in the FIG. 7, the computer system/server 700 is shown in the form of a general-purpose computing device. The components of computer system/server 700 may include, but are not limited to, one or more processors or processing units 702, a system memory 704, and a bus 706 that couple various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the invention.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the invention, as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of the computer system/server 700 via bus 706. It should be understood that, although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, the storage control system 600 for operating a storage system can also be attached to the bus system 706.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In a nutshell, the inventive concept may be summarized by the following clauses:

1. A computer-implemented method for operating a storage system, the storage system comprising a file system for managing a data object in one or more storage blocks of the storage system, the method comprising receiving from a file system manager a message indicating that the data object is to be encrypted, determining, in response to the received message, a set of unallocated storage blocks that were previously allocated for storing at least a portion of the data object, and rendering content of the unallocated storage blocks of the set unreadable.

2. The method according to clause 1, wherein the storage system is a tiered storage system comprising at least two storage tiers, and wherein the determining the set of unallocated storage blocks comprises identifying storage blocks of one storage tier of the at least two storage tiers previously allocated to the data object and migrated to the other storage tier of the at least two storage tiers currently allocated to the data object.

3. The method according to clause 1 or 2, wherein the rendering the content of the storage block of the set unreadable comprises erasing the content of the storage blocks of the set.

4. The method according to any of the preceding clauses, wherein the rendering the content of the storage block of the set unreadable comprises overwriting the content of the storage blocks of the set.

5. The method according to any of the preceding clauses, wherein the rendering the content of the storage block of the set comprises encrypting the content of the storage blocks of the set.

6. The method according to any of the preceding clauses, wherein the data object comprises at least one of a file, a logical unit, a logical volume, or a block of data.

7. The method according to any of the preceding clauses, wherein the storage system is a tiered storage system comprising at least two storage tiers and/or a second storage system, and wherein the determining the set of unallocated storage blocks comprises identifying an unencrypted copy of the data object in another storage tier or the second storage system, and generating a message indicative of the unencrypted copy.

8. The method according to clause 7, also comprising encrypting the unencrypted copy of the data object in another storage tier or another storage system, and rendering blocks in the other storage tier or other storage system relating to content of the unallocated storage blocks previously allocated to the unencrypted copy of the data object unreadable.

9. The method according to any of the preceding clauses, also comprising operating a block tracking module in communicative contact with the file system manager, wherein the block tracking module is adapted for keeping track of all allocated blocks and unallocated blocks of all data objects of the storage system enabling a block allocation history.

10. The method according to any of the preceding clauses, wherein the block tracking module is also adapted for keeping track of a data object if it has been moved to another storage system.

11. A storage control system for operating a storage system, the storage system comprising a file system for managing a data object in one or more storage blocks of the storage system, the storage control system comprising a block tracking module adapted for receiving from a file system manager a message indicating that the data object is to be encrypted, wherein the block tracking module is adapted for determining, in response to the received message, a set of unallocated storage blocks that were previously allocated for storing at least a portion of the data object, and rendering content of the unallocated storage blocks of the set unreadable.

12. The storage control system according to clause 11, wherein the storage system is a tiered storage system comprising at least two storage tiers, and
wherein the determining, by the block tracking module, the set of unallocated storage blocks comprises
identifying storage blocks of one storage tier of the at least two storage tiers previously allocated to the data object and migrated to the other storage tier of the at least two storage tiers currently allocated to the data object.

13. The storage control system according to clause 11 or 12, wherein the rendering, by the block tracking module, the content of the storage block of the set unreadable comprises erasing the content of the storage blocks of the set.

14. The storage control system according to any of the clauses 11 to 13, wherein the rendering, by the block tracking module, the content of the storage block of the set unreadable comprises overwriting the content of the storage blocks of the set.

15. The storage control system according to any of the clauses 11 to 14, wherein the rendering, by the block tracking module, the content of the storage block of the set comprises encrypting the content of the storage blocks of the set.

16. The storage control system according to any of the clauses 11 to 15, wherein the data object comprises at least one of a file, a logical unit, a logical volume, or a block of data.

17. The storage control system according to any of the clauses 11 to 17,
wherein the storage system is a tiered storage system comprising at least two storage tiers and/or a second storage system, and
wherein the determining, by the block tracking module, the set of unallocated storage blocks comprises
identifying an unencrypted copy of the data object in another storage tier or a second storage system, and
generating a message indicative of the unencrypted copy.

18. The storage control system according to clause 17, wherein the block tracking module is also adapted for
encrypting the unencrypted copy of the data object in another storage tier or another storage system, and
rendering blocks in the other storage tier or other storage system relating to content of the unallocated storage blocks previously allocated to the unencrypted copy of the data object unreadable.

19. The storage control system according to any of the clauses 11 to 18, wherein the block tracking module is in communicative contact with the file system manager, wherein the block tracking module is adapted for keeping track of all allocated blocks and unallocated blocks of all data objects of the storage system enabling a block allocation history.

20. A computer program product for operating a storage system, the storage system comprising a file system for managing a data object in one or more storage blocks of the storage system, the computer program product comprising a computer readable storage medium having program instructions embodied therewith, the program instructions being executable by one or more computing systems or controllers to cause the one or more computing systems to
receive from a file system manager a message indicating that the data object is to be encrypted,
determining, in response to the received message, a set of unallocated storage blocks that were previously allocated for storing at least a portion of the data object, and
rendering content of the unallocated storage blocks of the set unreadable.

What is claimed is:

1. A computer-implemented method for operating a storage system, the computer-implemented method comprising:
receiving, by one or more computer processors, from a file system manager a message indicating that a data object is to be encrypted, wherein the data object is stored in a storage system;
determining, by one or more computer processors, in response to the received message, a set of unallocated storage blocks that were previously allocated for storing at least a portion of the data object;
rendering, by one or more computer processors, a content of the set of unallocated storage blocks unreadable;
determining, by one or more computer processors, an unencrypted copy of the data object in a different storage tier than the first storage tier;
generating, by one or more computer processors, a message indicating the unencrypted copy;
encrypting, by one or more computer processors, the unencrypted copy of the data object; and
rendering, by one or more computer processors, blocks in the first storage tier relating to content of the unencrypted copy of the data object unreadable.

2. The method of claim 1, wherein the storage system is a tiered storage system comprising at least two storage tiers, and wherein the determining the set of unallocated storage blocks comprises:
identifying, by one or more computer processors, the set of unallocated storage blocks of a storage tier of the at least two storage tiers previously allocated to the data object and migrated to a different storage tier of the at least two storage tiers of the at least two storage tiers currently allocated to the data object.

3. The method of claim 1, wherein the rendering the content of the set of unallocated storage blocks unreadable comprises erasing the content of the set of unallocated storage blocks.

4. The method of claim 1, wherein the rendering the content of the set of unallocated storage blocks unreadable comprises overwriting the content of the set of unallocated storage blocks.

5. The method of claim 1, wherein the rendering the content of the set of unallocated storage blocks unreadable comprises encrypting the content of the set of unallocated storage blocks.

6. The method of claim 1, wherein the data object comprises at least one of a file, a logical unit, a logical volume, or a block of data.

7. A computer program product for operating a storage system, the computer program product comprising:
one or more computer readable storage medium; and
program instructions stored on the one or more computer readable storage media, the program instructions comprising:
program instructions to receive from a file system manager a message indicating that a data object is to be encrypted, wherein the data object is stored in a storage system;
program instructions to determine, in response to the received message, a set of unallocated storage blocks that were previously allocated for storing at least a portion of the data object; and program instructions to render a content of the set of unallocated storage blocks unreadable;

program instructions to determine an unencrypted copy of the data object in a different storage tier than the first storage tier;

program instructions to generate a message indicating the unencrypted copy;

program instructions to encrypt the unencrypted copy of the data object; and program instructions to render blocks in the first storage tier relating to content of the unencrypted copy of the data object unreadable.

8. The computer program product of claim 7, wherein the storage system is a tiered storage system comprising at least two storage tiers, and wherein the program instructions to determine the set of unallocated storage blocks comprises:

program instructions to identify the set of unallocated storage blocks of a storage tier of the at least two storage tiers previously allocated to the data object and migrated to a different storage tier of the at least two storage tiers of the at least two storage tiers currently allocated to the data object.

9. The computer program product of claim 7, wherein the program instructions to render the content of the set of unallocated storage blocks unreadable comprises program instructions to erase the content of the set of unallocated storage blocks.

10. The computer program product of claim 7, wherein the program instructions to render the content of the set of unallocated storage blocks unreadable comprises program instructions to overwrite the content of the set of unallocated storage blocks.

11. The computer program product of claim 7, wherein the program instructions to render content of the set of unallocated storage blocks unreadable comprises program instructions to encrypt the content of the set of unallocated storage blocks.

12. The computer program product of claim 7, wherein the data object comprises at least one of a file, a logical unit, a logical volume, or a block of data.

13. A computer system for operating a storage system, the computer system comprising:

one or more computer processors;

one or more computer readable storage medium; and program instructions stored on the one or more computer readable storage media for execution by at least one of the one or more computer processors, the program instructions comprising:

program instructions to receive from a file system manager a message indicating that a data object is to be encrypted, wherein the data object is stored in a storage system;

program instructions to determine, in response to the received message, a set of unallocated storage blocks that were previously allocated for storing at least a portion of the data object; and program instructions to render a content of the set of unallocated storage blocks unreadable;

program instructions to determine an unencrypted copy of the data object in a different storage tier than the first storage tier;

program instructions to generate a message indicating the unencrypted copy;

program instructions to encrypt the unencrypted copy of the data object; and program instructions to render blocks in the first storage tier relating to content of the unencrypted copy of the data object unreadable.

14. The computer system of claim 13, wherein the storage system is a tiered storage system comprising at least two storage tiers, and wherein the program instructions to determine the set of unallocated storage blocks comprises:

program instructions to identify the set of unallocated storage blocks of a storage tier of the at least two storage tiers previously allocated to the data object and migrated to a different storage tier of the at least two storage tiers of the at least two storage tiers currently allocated to the data object.

15. The computer system of claim 13, wherein the program instructions to render the content of the set of unallocated storage blocks unreadable comprises program instructions to erase the content of the set of unallocated storage blocks.

16. The computer system of claim 13, wherein the program instructions to render the content of the set of unallocated storage blocks unreadable comprises program instructions to overwrite the content of the set of unallocated storage blocks.

17. The computer system of claim 13, wherein the program instructions to render content of the set of unallocated storage blocks unreadable comprises program instructions to encrypt the content of the set of unallocated storage blocks.

18. The computer system of claim 13, wherein the data object comprises at least one of a file, a logical unit, a logical volume, or a block of data.

* * * * *